(12) United States Patent
Huang et al.

(10) Patent No.: US 9,195,898 B2
(45) Date of Patent: Nov. 24, 2015

(54) SYSTEMS AND METHODS FOR IMAGE RECOGNITION USING MOBILE DEVICES

(75) Inventors: Joseph Jyh-Huei Huang, San Diego, CA (US); Chang Yong, San Diego, CA (US); Hsiang-Tsun Li, San Diego, CA (US); Devender Akira Yamakawa, San Diego, CA (US); Jose Ricardo Dos Santos, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1111 days.

(21) Appl. No.: 12/537,520

(22) Filed: Aug. 7, 2009

(65) Prior Publication Data

US 2010/0260426 A1    Oct. 14, 2010

Related U.S. Application Data

(60) Provisional application No. 61/169,295, filed on Apr. 14, 2009.

(51) Int. Cl.
*G06K 9/00* (2006.01)
*G06K 9/20* (2006.01)
*G06F 17/30* (2006.01)

(52) U.S. Cl.
CPC ............ *G06K 9/20* (2013.01); *G06F 17/30247* (2013.01); *G06K 9/00671* (2013.01)

(58) Field of Classification Search
CPC ..................... G06F 17/30247; G06K 9/00671; G06K 9/20
USPC .................................................. 382/181, 218
See application file for complete search history.

(56) References Cited

U.S. PATENT DOCUMENTS

| 4,949,388 A | 8/1990 | Bhaskaran |
| 5,031,228 A | 7/1991 | Lu |
| 5,497,314 A | 3/1996 | Novak |

(Continued)

FOREIGN PATENT DOCUMENTS

| CN | 1413424 A | 4/2003 |
| CN | 1914611 A | 2/2007 |

(Continued)

OTHER PUBLICATIONS

International Search Report and Written Opinion—PCT/US2010/031059, International Search Authority—European Patent Office—Jul. 15, 2010.

*Primary Examiner* — Tom Y Lu
(74) *Attorney, Agent, or Firm* — Fariba Yadegar-Bandari; Scott A. Barker

(57) ABSTRACT

Implementations relate to systems and methods for real-time image recognition and mobile visual searching. A mobile device, such as a cellular phone, acquires an image and pre-processes the acquired image to generate a visual search query based on objects detected in the acquired image. The visual search query includes the acquired image or a query image extracted therefrom and metadata associated with the detected objects. The mobile device wirelessly communicates the visual search query to a remote server, and in response to the visual search query, the remote server recognizes an object in the query image based on the associated metadata. The remote server then generates information content based on the recognized object and communicates the information content to the mobile device to be presented via the mobile device.

57 Claims, 6 Drawing Sheets

(56) References Cited

U.S. PATENT DOCUMENTS

| | | | |
|---|---|---|---|
| 7,519,200 B2* | 4/2009 | Gokturk et al. | 382/118 |
| 8,520,979 B2* | 8/2013 | Conwell | 382/305 |
| 2004/0004616 A1* | 1/2004 | Konya et al. | 345/419 |
| 2005/0015370 A1 | 1/2005 | Stavely et al. | |
| 2005/0041840 A1 | 2/2005 | Lo | |
| 2006/0031486 A1* | 2/2006 | Miner | 709/224 |
| 2007/0005571 A1* | 1/2007 | Brewer et al. | 707/3 |
| 2008/0080745 A1* | 4/2008 | Vanhoucke et al. | 382/118 |
| 2008/0209010 A1 | 8/2008 | Zitnick, III et al. | |
| 2008/0226119 A1 | 9/2008 | Candelore et al. | |
| 2008/0279481 A1 | 11/2008 | Ando | |
| 2012/0132701 A1 | 5/2012 | Nakagawa et al. | |

FOREIGN PATENT DOCUMENTS

| | | |
|---|---|---|
| CN | 101288077 A | 10/2008 |
| JP | 2002245048 A | 8/2002 |
| JP | 2003518625 A | 6/2003 |
| JP | 2004220082 A | 8/2004 |
| JP | 2004297143 A | 10/2004 |
| JP | 2005509219 A | 4/2005 |
| JP | 2006227810 A | 8/2006 |
| JP | 2006293912 A | 10/2006 |
| JP | 2006526826 A | 11/2006 |
| JP | 2006526827 A | 11/2006 |
| JP | 2008242965 A | 10/2008 |
| JP | 2008311749 A | 12/2008 |
| JP | 2009015825 A | 1/2009 |
| JP | 2009076977 A | 4/2009 |
| WO | 0149056 | 7/2001 |
| WO | 2004109543 A1 | 12/2004 |
| WO | 2004109544 A1 | 12/2004 |
| WO | 2005114476 | 12/2005 |
| WO | 2007021996 | 2/2007 |
| WO | 2009037605 | 3/2009 |

* cited by examiner

SYSTEMS AND METHODS FOR IMAGE RECOGNITION USING MOBILE DEVICES

CLAIM OF PRIORITY UNDER 35 U.S.C. §119

The present application for patent claims priority to Provisional Application No. 61/169,295 filed Apr. 14, 2009, entitled "Systems and Methods for Image Recognition Using Mobile Devices," by Ricardo dos Santos, Yong Chang, Joseph Huang, Hsiang-Tsun Li, and Dev Yamakawa, assigned or under obligation of assignment to the same entity as this Application, and hereby expressly incorporated by reference herein.

BACKGROUND

The present teachings relate generally to methods and apparatus for performing image recognition and visual searching using a mobile device, and more particularly to platforms and techniques for pre-processing an image acquired on a mobile device to extract a reduced set of image parameters that can be communicated to a network recognition system to identify objects of interest, and search for relevant content based on that identification.

Advancements in cellular communication technology and mobile communication devices, such as the integration of camera and video recording technology onto such communication devices, incorporation of e-mail and short messaging services into cellular communication networks, and the like, have added greater flexibility, processing power, and communication capabilities to already ubiquitous mobile communication devices. As a result, such mobile communication devices have become more popular in the consumer marketplace, and many consumers now rely on their mobile communication devices, such as cellular phones, to take pictures and shoot videos, exchange messages in their social network, make purchase decisions, conduct financial transactions, and carry out other activities.

Advertising and other information content can be targeted, delivered, and priced based on the click-thru and conversion rates of the content by the intended recipients, which are affected by the relevance of the advertising content and the timeliness of its delivery. For example, a majority of consumers in Japan have used their cellular phones to take pictures of barcodes in printed advertisements to obtain information associated with the advertised products or services, and if relevant advertising content is promptly sent to the potential consumers' cellular phone, such advertising content is likely to have a high conversion rate. The potential consumers take pictures of a printed advertisement using their cellular phones, which then send multimedia messaging service (MMS) messages with the picture of the printed advertisement to a server. The server performs a one-to-one matching of the picture with a database of advertisements, and after about thirty to sixty seconds, the server sends a short messaging service (SMS) message containing a web link associated with the printed advertisement to the potential consumers. However, such advertising and information content targeting and delivery systems require a substantial amount of bandwidth to transmit the pictures of the printed advertisement and expend substantial resources and time to match the pictures with an entire database of advertisements.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to the present teachings in one or more aspects, methods and apparatus for performing image recognition and mobile visual searching are provided, in which a mobile device user acquires an image and receives information content associated with the image via the mobile device. In one or more implementations of the present teachings, the mobile device can detect, categorize, and/or recognize one or more objects based on salient feature clusters in the acquired image and generate a visual search query based on the objects. The visual search query can include the acquired image or a query image extracted therefrom and metadata associated with the objects. The mobile device can wirelessly communicate the visual search query to a remote server, which can generate information content in response to the visual search query, and thereafter the mobile device can receive and present the information content.

According to one implementation, the mobile device can detect and highlight the objects to the user and receive input that indicates at least one selected object. Objects can include, for example, a logo, a design, a face, a landmark, apparel, a sign, a natural or man-made object, and the like. The mobile device can then generate a feature vector based on the selected object and compare the feature vector with a set of image coefficients of trained images to determine a matching trained image that matches the selected object. The set of image coefficients can be stored in the mobile device. The mobile device can thereafter categorize and/or recognize the selected object based on the matching trained image and generate the metadata based on the matching trained image. The mobile device can also extract the query image from the acquired image based on the selected object, by, for example, cropping the acquired image, compressing the acquired image, scaling the acquired image, and converting the acquired image to grayscale.

According to one implementation, the mobile device can comprise sensors that acquire contextual data associated with the acquired image and include the contextual data in the visual search query. Contextual data can include, for example, a Global Positioning System (GPS) location fix, an Assisted GPS (A-GPS) location fix, a Galileo system location fix, a tower trilateration fix, user-entered text or auditory information, an accelerometer reading, a gyroscope reading, a temperature reading, etc.

According to one implementation, the mobile device can wirelessly communicate the visual search query to the remote server in the image recognition system. Upon receiving the visual search query, which includes a query image and metadata associated with at least one object in the query image, the remote server can recognize the object in the query image based on the associated metadata. For example, the remote server can select a set of trained images based on the associated metadata, compare the query image with the set of trained images to determine a matching trained image that matches the query image, and recognize the object in the image based on the matching trained image. The remote server can then generate information content based on the recognized object and communicate the information content in response to the visual search query. Information content can include, for example, a name, a price, a manufacturer, a review, a coupon, and an advertisement.

According to one implementation, the remote server can receive a visual search query that includes, in addition to the query image and the associated metadata, contextual data associated with the query image. In such implementation, the remote server can generate the information content based on the recognized object and the contextual data and thereafter communicate the information content to the mobile device in response to the visual search query.

According to one implementation, in one regard, because the mobile device pre-processes the acquired image prior to wirelessly communicating the visual search query, the mobile device can extract and send a relevant portion of the acquired image instead of the entire acquired image, and thus enhancing the speed at which the visual search query is communicated and decreasing the communication bandwidth requirement. Moreover, the remote server can utilize the metadata and/or contextual data associated with the query image to assist in recognizing the object of interest in the query image, which enables the remote server to focus the scope of the visual search, and thus improving the accuracy, speed, and efficiency of the remote server and the image recognition system as a whole. Furthermore, the remote server can focus or otherwise tailor the information content using the associated metadata and/or contextual data, which can enable the remote server and hence the image recognition system to provide relevant information content in real-time or near real-time, in response to the visual search query.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DESCRIPTION OF THE DRAWINGS

The accompanying drawings, which are incorporated in and constitute a part of this specification, illustrate aspects of the present teachings and together with the description, serve to explain principles of the present teachings. In the figures.

DETAILED DESCRIPTION

Figure 1:
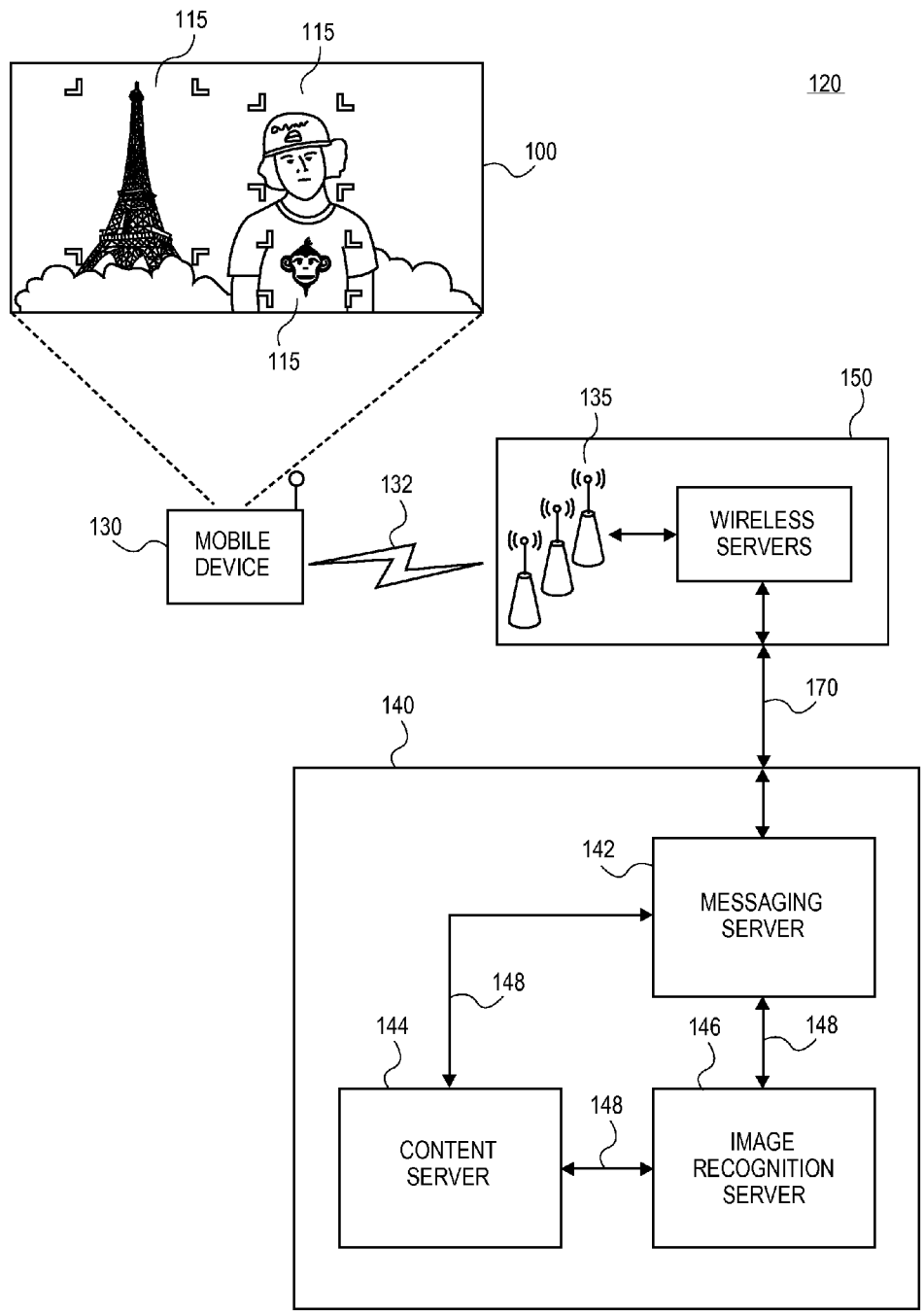
FIG. 1 illustrates an exemplary image recognition system that includes a mobile device having a portable image sensor and a remote server in a back-end of the image recognition system, consistent with one aspect of the present teachings.

Reference will now be made in detail to one implementation of the present teachings, an example of which is illustrated in the accompanying drawings. Wherever possible, the same reference numbers will be used throughout the drawings to refer to the same or like parts.

Various aspects are now described with reference to the drawings. In the following description, for purposes of explanation, numerous specific details are set forth in order to provide a thorough understanding of one or more aspects. It may be evident; however, that such aspect(s) may be practiced without these specific details.

In the subject description, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Additionally, various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Aspects of the present teachings relate to systems and methods for performing visual searches and image recognition via a mobile device. More particularly, in one or more aspects, and as for example generally shown in FIG. 1, platforms and techniques are provided in which mobile visual searches and image recognition is initiated via a mobile device 130 and performed in a time image recognition system 120. According to one implementation, and as for example generally shown in FIGS. 1 and 2, mobile device 130 can acquire and pre-process an image 100 to initiate a mobile visual search. Mobile device 130 can detect one or more objects based on clusters of salient features, or features of interest, in image 100 and highlight the detected objects, such as patterns 115, and compare the objects to trained images to categorize or recognize the objects. Mobile device can extract a sub-image from the acquired image based on the categorized or recognized objects. Mobile device 130 also can generate metadata based on the categorized or recognized objects and acquire contextual data, such as a Global Positioning System (GPS) location, associated with image 100. Mobile device 130 can generate and communicate a visual search query, including the acquired image or the sub-image extracted therefrom and the associated metadata and/or contextual data, to a remote server 140 via a wireless connection 132 and a wireless services provider 150. In one or more examples, the extracted sub-image has a smaller file size than that of the acquired image. Therefore a visual search query is communicated that includes the extracted sub-image, instead of the entire acquired image. This image reduction can enhance the speed at which the visual search query is communicated and decrease the communication bandwidth requirement to the server or other destination.

Figure 3:
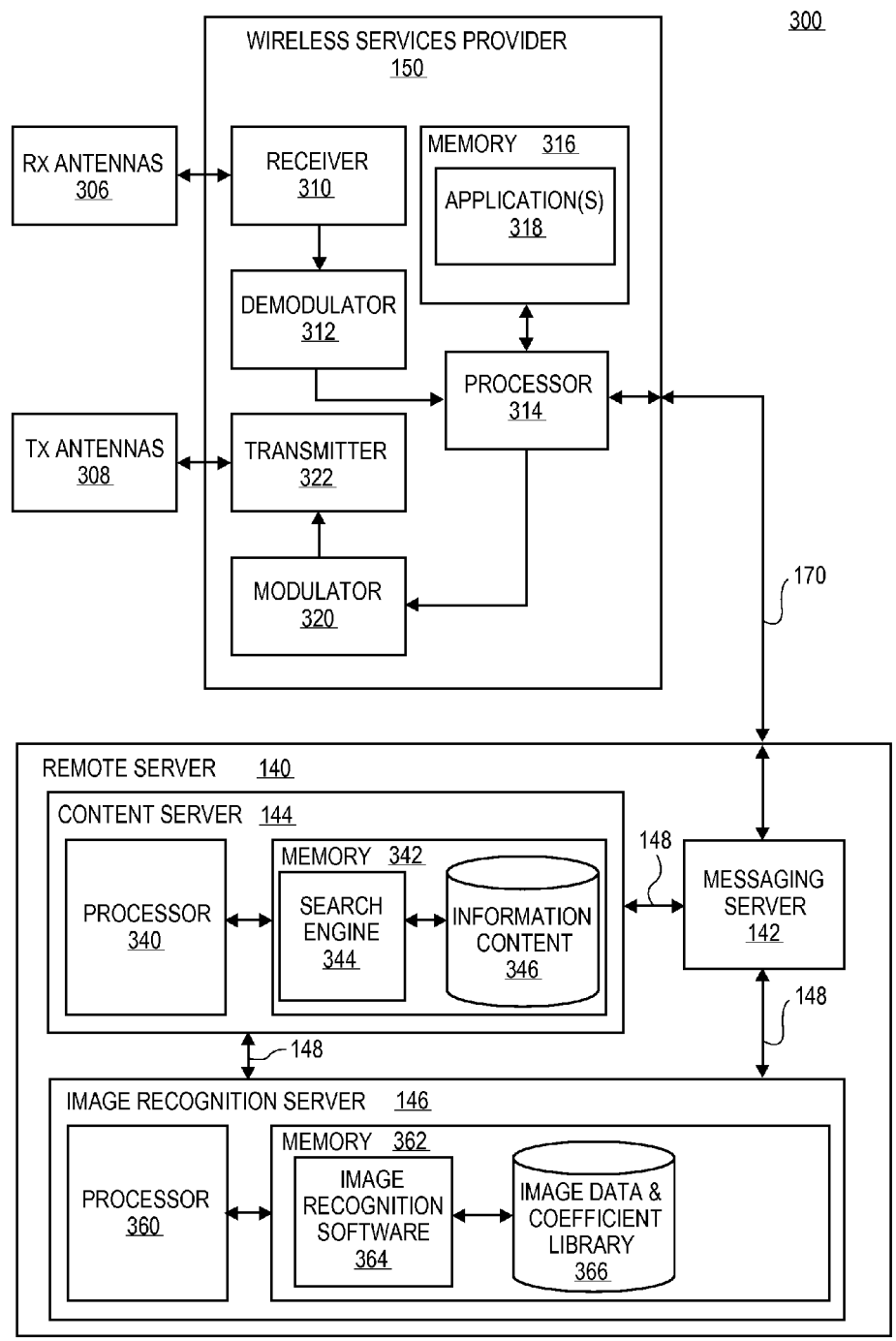
FIG. 3 illustrates an exemplary configuration of a back-end of an image recognition system for facilitating and participating in mobile visual searches and image recognition, consistent with one implementation of the present teachings.

According to one implementation, and as for example shown in FIGS. 1 and 3, remote server 140 of image recognition system 120 can receive the visual search query and generate information content to be presented via mobile device 130. Upon receiving the visual search query, which includes a query image and metadata and/or contextual data associated with the query image, remote server 140 can recognize at least one object in the query image based on the associated metadata. The remote server can generate information content based on the recognized object and the associated contextual data, and then communicate the information content to mobile device 130. Thereafter, mobile device 130 can present the information content in response to the visual search query.

With the benefit of the metadata and/or contextual data associated with the query image, remote server 140 can focus the scope of the visual search, and thus improving the accuracy, speed, and efficiency of remote server 140 and image recognition system 120 as a whole. Furthermore, remote server 140 can tailor the information content using the associated metadata and/or contextual data, which can enable remote server 140 and hence image recognition system 120 to provide relevant information content in real-time or near real-time, in response to the visual search query.

Image 100 or patterns 115 within image 100 captured by mobile device 130 can contain one or more clusters of salient features (e.g., features, objects of interest, etc.) that correspond to one or more objects. Objects can include, for example, without any limitations, a logo, a design, a face, a landmark, apparel (e.g., t-shirts, hats, shoes, pockets, etc.), a sign (e.g., a street sign, a restaurant sign, etc.) a bar code, an advertisement, a magazine, a newspaper, a poster (e.g., a "one-sheet," etc.), a billboard, a placard, a painting, a drawing, a backdrop on which the image is displayed or projected, a retail hang-tag, a digital video disc (DVD) case, a sticker, a ticket, a compact disc (CD) case, a baseball card, a soda can, and the like, or any combination thereof. In one example, image 100 or patterns 115 can be two-dimensional, even if the objects or the surface of the objects captured in image 100 are not flat and/or two-dimensional. FIG. 1 shows one implementation of image recognition system 120 in which image 100 and one or more patterns 115 are captured by mobile device 130 having a portable image sensor.

Image recognition system 120 can be provided to enable visual searching and to deliver information content associated with objects in image 100 and/or patterns 115 within image 100. Information content associated with the objects can comprise visual, auditory, or sensory content, or a descriptor of a location to make such content accessible. For example, the information content can be in the form of an image, text, streaming or non-streaming video, streaming or non-streaming audio, a Universal Resource Locator (URL), a Wireless Application Protocol (WAP) page, a Hyper Text Markup Language (HTML) page, an Extensible Markup Language (XML) document, an executable program, a filename, an Internet Protocol (IP) address, a telephone call, a pointer, or other content. The information content can be communicated to mobile device 130 via a communication protocol such as, for example, without any limitations, electronic mail (e-mail), multimedia messaging service (MMS), enhanced messaging service (EMS), short messaging service (SMS), WAP push, application push (e.g., a push registry, etc.), a standard form of telephony, or standard internet protocols such as Transmission Control Protocol (TCP), IP, User Datagram Protocol (UDP), hypertext transfer protocol (HTTP), and File Transfer Protocol (FTP).

As shown in FIG. 1, image recognition system 120 comprises mobile device 130 that captures, generates, acquires, or otherwise replicates image 100, sub-images of which can include patterns 115 that include one or more objects, and generates a visual search query based on the objects. Image 100 is an electronic representation of the objects captured by mobile device 130. For example, image 100 can be a data structure comprising a two-dimensional array of pixel information. Examples of mobile device 130 can include any mobile electronic device, such as, without any limitations, a cellular telephone ("cell phone"), a personal digital assistant (PDA), a digital camera, or a wireless telephone adapted to operate on a wireless access network, such as a wireless access network operating using an IEEE 802.16 standard (WiMAX) or an IEEE 802.11 standard (Wi-Fi), or an electronically coupled set of two or more of these devices, such as a digital camera that is in wired or wireless communication with a PDA.

Figure 2:
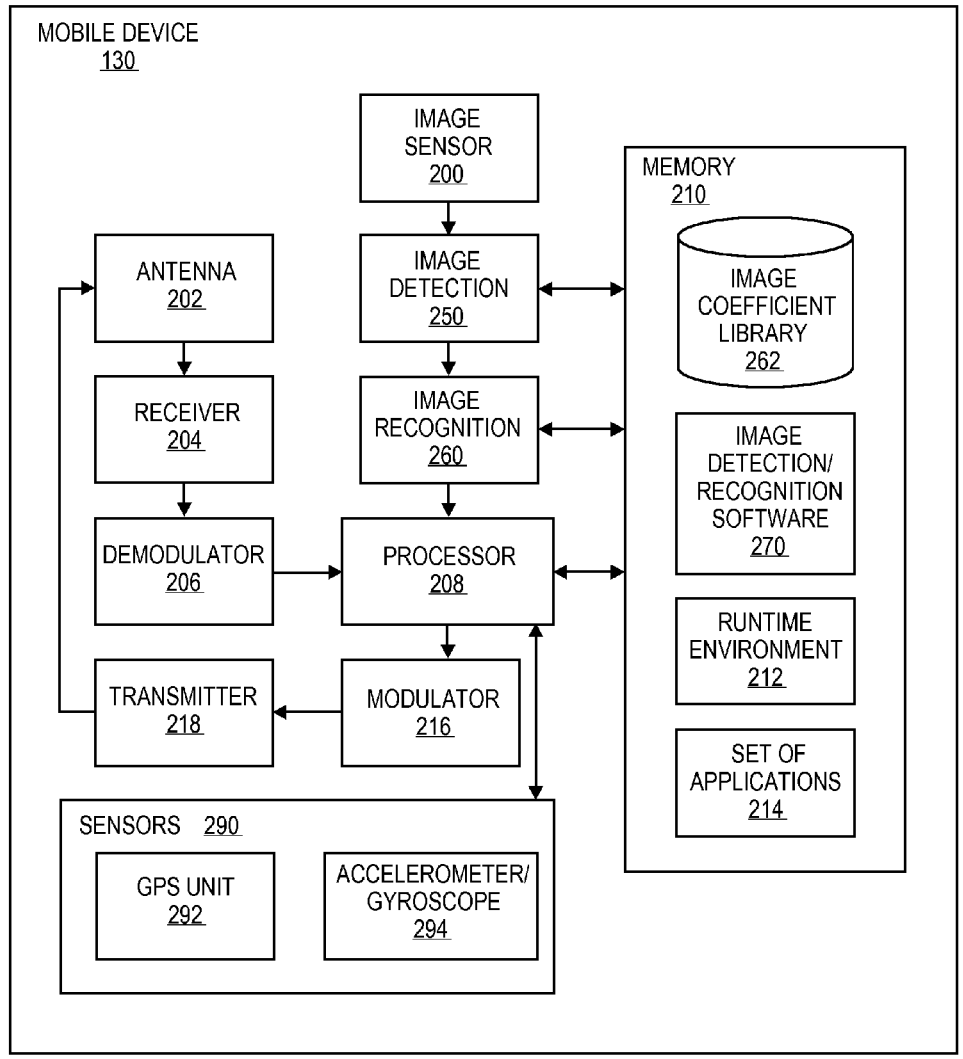
FIG. 2 illustrates an exemplary configuration of a mobile device, according to one implementation of the present teachings.

Mobile device 130 comprises a portable image sensor (e.g., an image sensor 200 as shown in FIG. 2, etc.), which can be any electronic device capable of generating image 100. For example, the portable image sensor can comprise either a charge coupled device (CCD) sensor or a complementary metal-oxide-semiconductor (CMOS) sensor, and a set of optical lenses to convey a light pattern onto the sensor and thereby generate image 100. In one implementation, the portable image sensor is built into mobile device 130. In operation, a user points the portable image sensor of mobile device 130 in a general direction of a target, and mobile device 130 generates image 100 after capturing an area covering the target. Mobile device 130 can also retrieve one or more stored images or capture one or more frames of a video to generate image 100. For example, in lieu of generating an image using the portable image sensor, mobile device 130 can retrieve an image stored in mobile device 130 or sent via a communication protocol (e.g., e-mail, MMS, EMS, SMS, HTTP, UDP, etc.) to generate image 100. In one implementation, a retrieved image or captured frame can include a visual search result and/or user annotation from a previously conducted visual search, and mobile device 130 can display the visual search result and/or user annotation independent of or in conjunction with (e.g., superimposed over) image 100. As will be described in greater detail below, mobile device 130 can detect objects in image 100 and highlight or otherwise indicate in real-time or near real-time one or more of the objects to the user. In terms of integration in mobile device 130, object detection can be performed or enhanced using BREW® Programming Interface (BREW® API) available from Qualcomm Incorporated of San Diego, Calif. Other image detection and recognition APIs or services can be used to integrate object detection in mobile device 130, such as APIs and services that are executable under Java Platform, Micro Edition (Java ME™) from Sun Microsystems, Symbian™ OS from Symbian Ltd., Flash Lite™ from Adobe Systems, Windows Mobile™ from Microsoft Corporation, iPhone™ OS from Apple Inc., Android™ from Open Handset Alliance, or the like.

Mobile device 130 can also include the capability to detect the location, position, orientation, movement, and/or other contextual data associated with mobile device 130 when generating image 100. The detection and identification of the location or position of mobile device 130, for example, can be performed using various positioning services, such as the Global Positioning System (GPS), Assisted GPS (A-GPS), base-station triangulation or trilateration based on cellular telephone base station triangulations or trilaterations to a registered cellular telephone, the European Galileo position system, or other positioning or location services or techniques. The detection and identification of the orientation or movement of mobile device 130, for example, can be performed using various services, such as built-in sensors (e.g., sensors 290 as shown in FIG. 2, etc.), including, for example, a GPS unit, an accelerometer, a gyroscope, and/or other orientation and movement detection services or techniques. Mobile device 130 can further include a user input interface (e.g., a keypad, a microphone, and the like) that can receive user-entered text or auditory information and provide the text or auditory information as contextual data. Mobile device 130 can also include other types of sensors, such as a temperature sensor, that can provide other types of contextual data. As shown in FIG. 1, mobile device 130 can communicate with wireless services provider 150 via wireless connection 132 and one or more base stations 135 supported by one or more wireless servers operating within image recognition system 120. Wireless services provider 150 can in turn communicate with a set of resources including, for example, a user database storing user-related subscription, configuration, positioning, and other information.

In one implementation, image recognition system 120 can further comprise remote server 140 that operates in conjunction with mobile device 130 and wireless services provider 150 to enable visual searching and to deliver in real-time, near real-time, or otherwise, the information content relevant to the objects in image 100. Remote server 140 comprises one or more servers 142, 144, and 146, which can be coupled by connections 148 across one or more communications networks, such as a local area network (LAN), an intranet, or the internet. For example, remote server 140 can include one or more of messaging server 142 to handle communications with wireless services provider 150 and/or mobile device 130 and to deliver, or provide access to, the information content to mobile device 130 in response to a visual search query, which can include image data, metadata, and/or contextual data associated with image 100; content server 144 to store and provide the information content; and image recognition server 146 to determine what information content to deliver and/or how the information content is delivered. In one implementation, messaging server 142, content server 144, and image recognition server 146 can reside at different physical locations and be communicatively coupled via connections 148 over the internet. For example, messaging server 142 and image recognition server 146 can be physically resident at a location managed by a cellular telephone company that also manages wireless services provider 150. Meanwhile, content server 144 can physically reside at an advertisement sales network, marketing provider, content provider, media provider, or other provider or source of content to be delivered to mobile device 130.

Remote server 140 can be coupled to wireless services provider 150 via one or more communications connection 170, which can include wired electrical links (e.g. a T1 or T3 line, etc.), wireless links, optical links, or other modes of communicative coupling. Wireless services provider 150 can provide cellular telephony or other digital communications services to users of electronic devices, such as mobile device 130. For example, wireless services provider 150 can be a cellular telephone service provider (such as Sprint Nextel Corporation, etc.), a personal communications services (PCS) provider, or a provider of other wireless services. Wireless services provider 150 can include one or more wireless servers and a network of base stations 135. Mobile device 130 can communicate via base stations 135 with the wireless servers of wireless services provider 150 using a multi-tiered (e.g., client-server, etc.) software architecture over wireless connection 132. Thus, mobile device 130 can communicate with remote server 140 via wireless services provider 150, and remote server 140 can deliver relevant information content to mobile device 130 via wireless services provider 150. Delivering the information content can include presenting the information content to the user of image recognition system 120. For example, the information content can be transmitted to mobile device 130 to be presented to the user, such as on a visual display or on audio speakers.

Reference will now be made to FIG. 2 to illustrate an exemplary configuration of mobile device 130, consistent with one or more implementations of the present teachings. Mobile device 130 (as shown in FIG. 1) can include at least one antenna 202 (e.g., a transmission receiver or group of such receivers comprising an input interface, etc.) that receives a signal (e.g., pertaining to a mobile call initiation or other handshake, a handshake response, a mobile application data transfer, a data event, data event response, handshake termination, and so on) and a receiver 204, which performs actions (e.g., filters, amplifies, down-converts, and the like) on the received signal. Antenna 202 can for example transmit or receive a response to a handshake request, data event request, or the like. Antenna 202 and receiver 204 can also be coupled with a demodulator 206 that can demodulate received signals and provide them to a processor 208 for processing. Mobile device 130 can additionally include memory 210, which includes one or more computer-readable medium, that is operatively coupled to processor 208 and that can store instructions to be executed and data to be transmitted, received, processed, and the like.

Processor 208 can analyze information received by antenna 202 and/or a user input interface (not depicted) of mobile device 130, and/or generate information for transmission by a transmitter 218 via a modulator 216. Additionally, processor 208 can control and/or reference one or more resources or components of mobile device 130, including, for example, an image sensor 200, demodulator 206, memory 210, modulator 216, transmitter 218, an image detection unit 250, an image recognition unit 260, and sensors 290. Processor 208 can also execute a runtime environment 212, such as BREW® from Qualcomm Incorporated, Java ME™ from Sun Microsystems, Symbian™ OS from Symbian Ltd., Flash Lite™ from Adobe Systems, Windows Mobile™ from Microsoft Corporation, iPhone™ OS from Apple Inc., Android™ from Open Handset Alliance, or the like, as well as a set of applications 214 or other software, modules, applications, logic, code, or the like.

In one implementation, mobile device 130 includes memory 210 to store computer-readable data (e.g., image 100 as shown in FIG. 1, an image coefficient library 262, and the like) and computer-executable software instructions (e.g., image detection/recognition software 270, runtime environment 212, set of applications 214, and the like). Memory 210 can comprise one or more of a solid state memory (e.g., read-only memory, random access memory, flash memory, and the like), a magnetic hard drive, an optically-readable medium such as a compact disc (CD) or digital video disc (DVD), and the like. Mobile device 130 can also comprise at least one processor 208 to execute software instructions stored in memory 210. The instructions are executed to configure processor 208 to control and/or perform, for example, the functions of image sensor 200, image detection unit 250, and image recognition unit 260, as will be described in greater detail below, for example, with respect to FIG. 4.

The image sensing capability and the image detection and/or recognition functionality are shown, in one implementation, as involving processing by image sensor 200, image detection unit 250, and image recognition unit 260 of mobile device 130. For example, image sensor 200 can comprise either a CCD sensor or a CMOS sensor, and a set of optical lenses that convey a light pattern onto the sensor and thereby generate image 100. In operation, a user can point image sensor 200 of mobile device 130 in a general direction of a target, and image sensor 200 can generate image 100 after capturing an area covering the target. Mobile device 130 can also retrieve one or more stored images or capture one or more frames of a video to generate image 100. In one implementation, image sensor 200 is built into mobile device 130. However, the functionality of image detection and image recognition can fully reside in mobile device 130, in remote server 140, or in any combination thereof. For example, image detection unit 250 and image recognition unit 260 can be implemented as one or more sets of image processing software (e.g., image detection/recognition software 270, etc.) stored in memory 210 of mobile device 130 and executable by processor 208.

In one implementation, image detection/recognition software 270 can provide mobile device 130 and components thereof with an interface to the functionality of image sensor 200, image detection unit 250, and/or image recognition unit 260. Image detection/recognition software 270 can include algorithms for detecting one or more categories of objects in an image and/or recognizing the objects in the image based on salient feature clusters. The algorithms can include, for example, scale-invariant feature transformation (e.g., SIFT, SIFT++, LTI-lib SIFT, and the like), speeded up robust features (e.g., SURF, SURF –d, and the like), augmented reality (e.g., BazAR, etc.), and other image detection and recognition algorithms known to those skilled in the art. Image detection/recognition software 270 can also include algorithms for detecting the categories of, or categorizing, one or more objects in an image based on salient feature clusters corresponding to the objects in the image, such as a biological visual cortex network (e.g., Hierarchal Maximization Architecture, HMAX, etc.) and other object categorization algorithms known to those skilled in the art. Object categories can include, for example, natural objects, such as faces, animals, vegetation, land features, and the like. Object categories can also include, for example, man-made objects, such as logos, designs, buildings, landmarks, apparels, signs, vehicles, and the like. Although the terms "categories of objects" and "object categories" are used to describe sets of objects that share certain characteristics, other analogous terms known to one skilled in the art can be used interchangeably, such as classes of objects, kinds of objects, types of objects, and the like.

In one implementation, mobile device 130 can use one or more algorithms to detect objects in an image, use the same or different algorithms to detect the categories of the objects, and/or use the same or different algorithms to recognize the objects. In one implementation, mobile device 130 can select a recognition algorithm based on the detected object categories. For example, mobile device 130 can use HMAX to detect and categorize objects in image 100, and then use SIFT to recognize the objects in image 100 that are categorized as man-made objects.

In one implementation, image detection/recognition software 270 can include an algorithm for detecting logos. Logos appear on nearly every product for marketing purposes, and the logo detection algorithm can facilitate mobile visual searching by detecting logo patterns and their boundaries within the image. Logos can have highly contrasting but limited levels of luminance and/or colors, and thus logo patterns' luminance and/or chrominance histogram can have two major peaks. Based on these observed characteristics, logo patterns can be efficiently detected by acquiring a histogram of luminance (or luma if the RGB components are gamma-compressed) and chrominance components using, for example, Formula 1 shown in Table 1.

TABLE 1

Formula 1: Luminance and Chrominance Components Acquisition

Joint component = Y + Cb + Cr, where Y is the luminance or luma component, Cb is the blue-difference chrominance component, and Cr is the red-difference chrominance component;
Bin = (Joint component) * Normalization_factor,
where Normalization_factor is used to convert joint component to a bin index;
Histogram[bin] = Histogram[bin] + 1

The histogram of luminance and chrominance components can have any number of bins. In one example, a 16-bin histogram provides sufficient resolution to distinguish the major peaks of a logo pattern. After acquiring the histogram of luminance and chrominance components, the logo detection algorithm can locate the strongest peaks, typically two, in the histogram. The logo detection algorithm can ensure that the two strongest peaks at different bins of the histogram, represented as (peak1, bin1) and (peak2, bin2), satisfy the criteria provided in Table 2.

TABLE 2

Peak1 + Peak2 > Peak_threshold * Image_size
Peak1 – Peak2 < Difference_threshold * Image_size
Abs(bin1 – bin2) > Bin_index_threshold After detecting the logo pattern, the logo detection algorithm can detect the logo pattern boundary using a one-dimensional (1-D) projection algorithm. The 1-D projection algorithm can obtain the delta of maximum joint component and minimum joint component in X and Y directions using, for example, Formula 2 provided in Table 3.

TABLE 3

Formula 2: 1-D Projection Algorithm

X projection = Max(Joint component) – Min(Joint component) for each column;
Y projection = Max(Joint component) – Min(Joint component) for each row The logo detection algorithm can determine the logo pattern boundary based on the X projection and Y projection. In one example, the logo detection algorithm can determine the logo pattern boundary efficiently and with a high level of confidence because of the significant delta on the X projection and Y projection waveform of the logo pattern. The logo detection algorithm stored in image detection/recognition software 270 can be used by image detection unit 250 to detect and/or locate one or more logos within image 100, as will be described in greater detail below, for example, with respect to FIG. 4.

In one implementation, the image processing software can access image coefficient library 262, which can store image coefficients of possible image candidates or trained images. Each of the trained images can have a corresponding vector of coefficients, or an image coefficient, that uniquely represents the trained image. An image coefficient can include a set of numbers that form a signature of a corresponding trained image, and the size of the image coefficient generally corresponds to the category of the trained image. For example, the image coefficient for a logo (e.g., a BREW GAMING MONKEY™ logo, etc.) can have a size of about 22×18×32 bytes, or about 12 kilobytes, and the image coefficient for a person's face can have a size of more than a megabyte. The trained images can be categorized based on objects contained in them using a categorization algorithm such as, for example, HMAX, K-Nearest Neighbor, Support Vector Machines, neural networks, Randomized Trees, or other categorization algorithms known to one skilled in the art. The image coefficients of the trained images can be stored in image coefficient library 262, and can also be indexed according to categories of the objects in the trained images, metadata (e.g., an object category, a brand, and the like), and/or contextual data (e.g., a GPS location, a location identifier, and the like) associated with the trained images. The image coefficients of the trained images stored in image coefficient library 262 can be used by image detection unit 250 and image recognition unit 260 to categorize, recognize, or otherwise identify one or more objects within image 100 and/or patterns 115, as will be described in greater detail below, for example, with respect to FIG. 4.

The image processing software in mobile device 130 can further comprise image editing software, which can be used to crop, compress, scale, convert to grayscale, or otherwise process image 100 captured by image sensor 200 to extract or otherwise generate sub-images that include patterns 115. For example, image 100 can be cropped or otherwise processed based on objects that are detected, categorized, and/or recognized. Alternatively or in addition, image 100 can be cropped or otherwise processed according to instructions received from or specified by the user of mobile device 130 or according to computer-readable instructions that have previously been received by mobile device 130. The image processing software can be written in any suitable programming language and/or development environment, such as BREW®, Java ME™, Symbian™ OS, Flash Lite™, Windows Mobile™, iPhone™ OS, Android™, or the like. Alternatively or in addition, image detection unit 250 and image recognition unit 260 can be implemented as hardware in mobile device 130. The hardware can comprise electronic circuitry that includes passive and/or active electronic components. For example, in one implementation, the hardware can be implemented in at least one Application Specific Integrated Circuit (ASIC).

Reference will now be made to FIG. 3 to illustrate an exemplary configuration of a back-end 300 of image recognition system 120, including remote server 140 and wireless services provider 150, which can facilitate and/or participate in image recognition and visual searching, consistent with implementations of the present teachings. In one implementation, back-end 300 can include wireless services provider 150 with a receiver 310 that receives one or more signals from one or more mobile devices (e.g., mobile device 130 as shown in FIG. 1, etc.) through receive antennas 306, and a transmitter 322 that transmits one or more signals modulated by modulator 320 to the mobile devices through transmit antennas 308. Receiver 310 can receive information from receive antennas 306 and can further include a signal recipient (not shown) that receives feedback data related to an un-received or indecipherable data packet. Additionally, receiver 310 is operatively associated with a demodulator 312 that demodulates received information. A processor 314 can analyze demodulated symbols and information provided by demodulator 312.

Processor 314 further couples to a memory 316 that can store one or more applications 318 that facilitate and/or participate in remote communication between the mobile devices, wireless services provider 150, and/or remote server 140. For instance, applications 318 can include a primary application configured to initiate a handshake and send data event requests (e.g., related to diagnostic information, data analysis, and so on) to a recipient application operating on the mobile devices. Alternatively, applications 318 can include a secondary application that can receive a handshake request and authenticate an initiating application on the mobile devices. Applications 318 can further include rules for generating and/or verifying identifiers that identify applications 318 to a corresponding application on the mobile devices or vice versa, or an increment of such identifiers identifying a particular round-trip communication. Further, the rules can specify policies for re-transmitting un-acknowledged transmissions, re-initiating handshake requests and/or responses, and terminating a handshake, or the like. Consequently, applications 318 can engage in mobile communication with one or more applications (e.g., set of applications 214 as shown in FIG. 2, etc.) resident upon the mobile devices, and/or any other suitable activity related to performing the various actions and functions set forth herein.

In one implementation, back-end 300 can include remote server 140 that operates in conjunction with the mobile devices (e.g., mobile device 130, etc.) and wireless services provider 150 to enable image recognition and visual searching. Remote server 140 can include messaging server 142 to handle communications with the mobile devices and/or wireless services provider 150 and to deliver, or provide access to, the information content to the mobile devices in response to a visual search query. For example, messaging server 142 can receive a visual search query, which can include image 100 or one or more sub-images (e.g., patterns 115, etc.) extracted from image 100 together with metadata and/or contextual data associated with image 100 and generated by the mobile devices, and then transmit the visual search query to image recognition server 146. For another example, messaging server 142 can receive a visual search result, which can include information content relevant to image 100 or the extracted sub-images, generated by content server 144 in response to a visual search query, and then transmit the visual search result to wireless services provider 150 for transmission to the mobile devices.

Remote server 140 can include or communicate with image recognition server 146 to recognize or otherwise identify one or more objects within image 100 or one or more of the extracted sub-images based on image data, metadata, contextual data associated with image 100, and/or user feedback for search results previously provided for similar visual search queries. User feedback for a search result can include, for example, a binary response (e.g., yes/no, true/false, good/bad, etc.) or a scaled response (e.g., from a scale of 1 to 10) regarding the accuracy or relevance of the search result, user annotations for the search result, user follow-up action in response to the search result (e.g., clicks on a link or advertisement provided in the search result, etc.), and the like. Image recognition server 146 can further generate a semantic search query based on at least one recognized object, metadata, and/or contextual data associated with image 100, as well as any user feedback for previously provided search results. In one implementation, image recognition server 146 includes a processor 360 and a memory 362, which includes one or more computer-readable medium that is operatively coupled to processor 360 and can store instructions to be executed and data to be transmitted, received, processed, and the like. Memory 362 can comprise one or more of a solid state memory, a magnetic hard drive, an optically-readable medium such as a CD or DVD, and the like. The instructions stored therein are executed to configure processor 360 to control and/or perform, for example, visual searching and image recognition in conjunction with other components of image recognition system 120. For example, memory 362 can store image recognition software 364 and an image data and coefficient library 366. Image recognition software 364 can access image coefficient library 366, which can store and index image data and/or coefficients of possible image candidates or trained images. The trained images can be categorized based on objects contained in the trained images using a categorization algorithm such as, for example, HMAX, K-Nearest Neighbor, Support Vector Machines, neural networks, Randomized Trees, or other categorization algorithms known to one skilled in the art. Image coefficient library 366 can index the trained images according to categories of the objects in the trained images, metadata (e.g., an object category, a brand, and the like), and contextual data (e.g., a GPS location, a location identifier, and the like) associated with the trained images. Each of the trained images has data and/or a vector of coefficients uniquely representing the trained image, which can be stored in image data and coefficient library 366 and used by image recognition software 364 to recognize one or more objects within image 100 or patterns 115, as will be described in greater detail below, for example, with respect to FIG. 5.

Remote server 140 can further include or communicate with content server 144 to store, index, and provide information content, such as, for example, product information (e.g., name, price, manufacturer, specification, reviews, advertisements, coupons, promotions, etc.), directed links to the product information, action links (e.g., links to online retailers for comparison shopping, to save to a wish list, to share with a friend, to purchase instantly, etc.), celebrity information (e.g., name, biography, products and/or services associated with the celebrity, etc.), landmark information (e.g., name, history, products and/or services associated with the landmark, etc.), and the like, or any combination thereof. Content server 144 can provide relevant information content in response to, for example, a semantic search query generated by image recognition server 146 based on at least one object, metadata, and/or contextual data associated with image 100.

In one implementation, content server 144 includes a processor 340 and a memory 342, which includes one or more computer-readable medium that is operatively coupled to processor 340 and can store instructions to be executed and data to be transmitted, received, processed, and the like. Memory 342 can comprise one or more of a solid state memory, a magnetic hard drive, an optically-readable medium such as a CD or DVD, and the like. The instructions stored therein are executed to configure processor 340 to search for and provide relevant information content based on image 100 or patterns 115, in conjunction with other components of image recognition system 120. For example, memory 342 can store instructions for a search engine 344 and an information content database 346.

Search engine 344 can locate and provide relevant information content in response to a search query from the mobile devices and/or image recognition server 146. In the implementation shown, prior to receiving search queries, content server 144 can perform a crawl of information content database 346 and/or other computer-readable data storage coupled to remote server 140 to locate and index information content stored therein. Thus, search engine 344 can locate relevant information content by accessing the index in response to the search queries. Accordingly, information content server 144 can determine what information content to deliver to the mobile devices and/or how to deliver the information content, such as the form of the information content and the communication protocol, etc., based on the semantic search query generated by image recognition server 146, as will be described in greater detail below, for example, with respect to FIG. 5.

Figure 4:
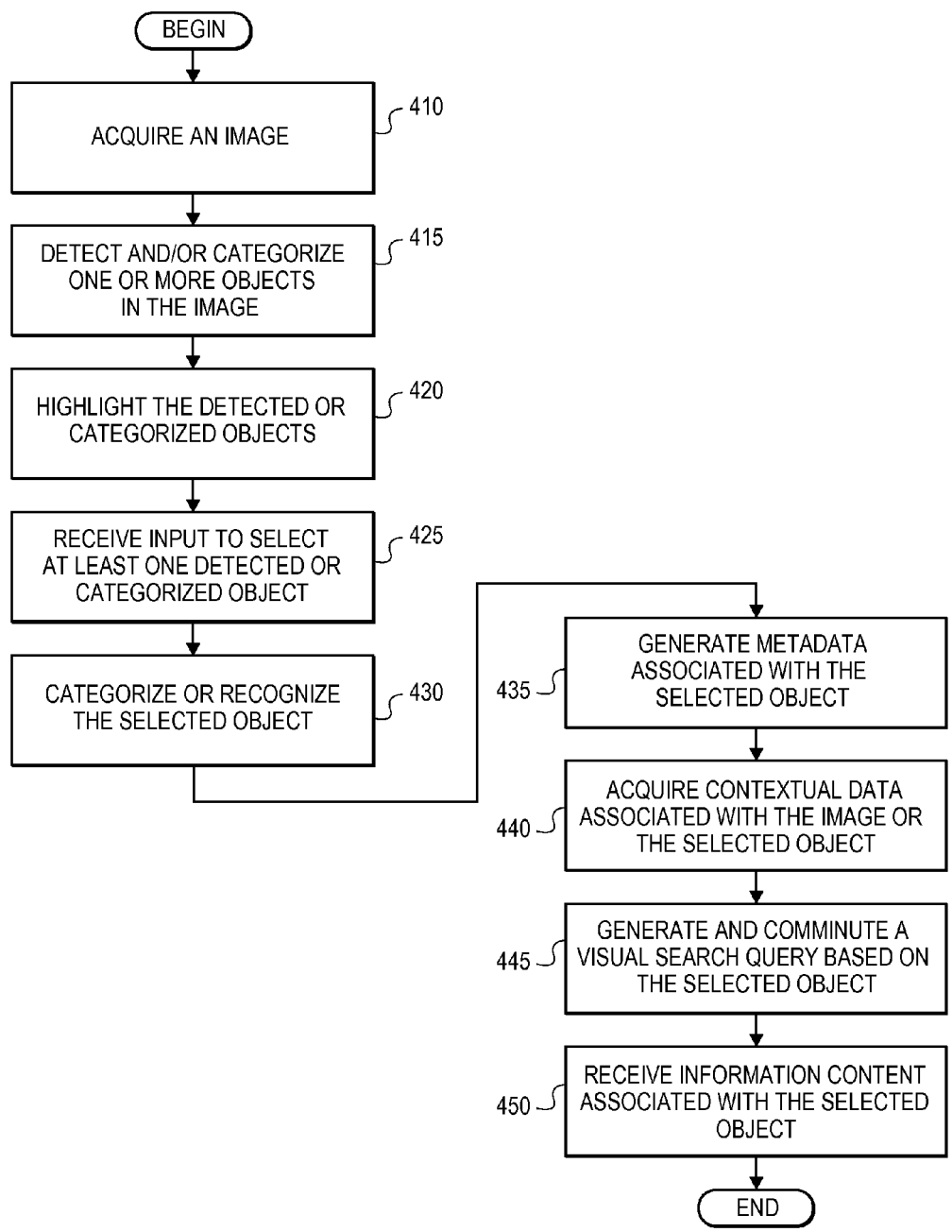
FIG. 4 illustrates a flowchart of processing performed by a mobile device to enable mobile visual searching and facilitate image recognition, according to another implementation of the present teachings.
Figure 5:
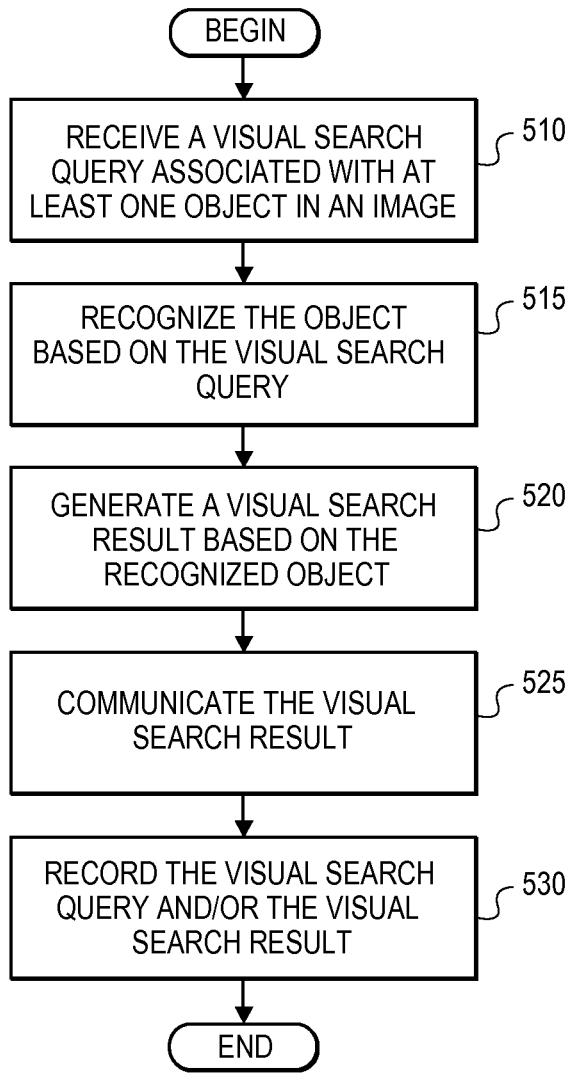
FIG. 5 illustrates a flowchart of processing performed by a back-end of an image recognition system to enable mobile visual searching and facilitate image recognition, according to yet another implementation of the present teachings.

FIGS. 4 and 5 illustrate methodologies and/or flow diagrams in accordance with one or more aspects of the present teachings. For simplicity of explanation, the methodologies are depicted and described as a series of acts. It is to be understood and appreciated that the subject innovation is not limited by the acts illustrated and/or by the order of acts. For example, acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 6A:
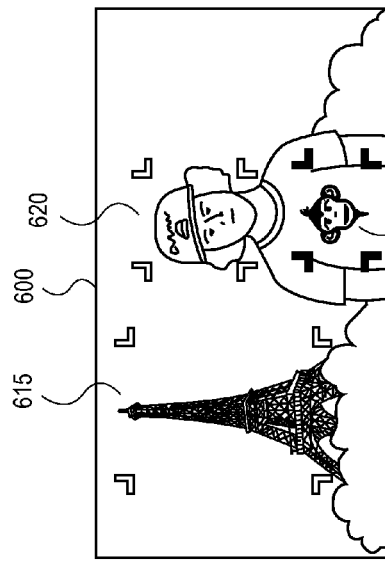
FIGS. 6A-6D illustrate a processing sequence of an exemplary mobile visual search, according to still another implementation of the present teachings.

FIG. 4 illustrates a flowchart of processing that can be performed by mobile device 130 (as shown in FIGS. 1 and 2) to enable visual searching and facilitate image recognition using image recognition system 120 (as shown in FIG. 1), according to one or more implementations of the present teachings. In 410, mobile device 130 can initiate visual searching and image recognition by acquiring an image (e.g., image 100 as shown in FIG. 1, image 600 as shown in FIG. 6A, etc.). For example, a user of mobile device 130 can point image sensor 200 of mobile device 130 in a general direction of a target, and mobile device 130 can capture, generate, acquire, or otherwise replicate an image that is representative of the target. Mobile device 130 can also retrieve one or more stored images or capture one or more frames of a video to generate the image. For example, in lieu of generating the image using the image sensor 200, mobile device 130 can retrieve an image stored in mobile device 130 or sent via a communication protocol (e.g., e-mail, MMS, EMS, SMS, HTTP, UDP, etc.) to generate the image. In one implementation, a retrieved image or captured frame can include a visual search result and/or user annotation from a previously conducted visual search, and mobile device 130 can display the visual search result and/or user annotation independent of or in conjunction with (e.g., superimposed over) image 100.

Next, in 415, mobile device 130 can detect the presence and location of one or more objects based on salient feature clusters that correspond to the objects in the acquired image. In one implementation, mobile device 130 can begin detecting objects without an affirmative input or other action from the user, e.g., depressing the shutter; instead, mobile device 130 can compare successively acquired images to determine when image sensor 200 is still or has been still for a threshold period of time, and can begin detecting objects accordingly. In another implementation, mobile device 130 can begin detecting objects after an affirmative input or other action from the user.

In one implementation, object detection can be performed or enhanced by using one or more image detection algorithms stored in mobile device 130, e.g., detection algorithms stored in and performed by image detection/recognition software 270 and image detection unit 250 as shown in FIG. 2, etc. Objects can be detected, for example, by locating keypoints in the image, such as lines, edges, ridges, corners, blobs, T-junctions, or other salient features, and then generating keypoint vectors based on points or regions neighboring each of the keypoints. Using the keypoint vectors, mobile device 130 can locate the objects in the image, and then for each of the objects, mobile device 130 can generate a feature vector that uniquely represents the corresponding object. Other image detection algorithms can be used, including, for example, HMAX, SIFT, SIFT++, LTI-lib SIFT, SURF, SURF –d, BazAR, or other image detection algorithms known to those skilled in the art.

In one implementation, object detection can be performed for various categories of objects, such as logos, designs, faces, landmarks, apparels, signs, objects, and the like. In one aspect, object detection can be performed for only one or more preselected or user-selected categories of objects. For example, object detection can utilize the logo detection algorithm stored in image detection/recognition software 270 to detect and/or locate only logos or logo-like patterns in the image. Alternatively or in addition, mobile device 130 can determine the detected objects' categories by generating, in real-time, feature vectors corresponding to the detected objects and comparing the feature vectors with image coefficients of possible image candidates, or trained images, for the selected category or categories of objects stored in image coefficient library 262. Each of the trained images has a corresponding vector of coefficients uniquely representing the features in the trained image. In one implementation, mobile device 130 can compare the detected objects' feature vectors with vectors of coefficients of the selected category or categories of trained images by calculating a distance (e.g., Manhalanobis distance, Euclidean distance, etc.) between the vectors to determine the categories of the detected objects.

In one implementation, mobile device 130 can detect the objects in the acquired image prior to enhancing the acquired image for human viewing (e.g., enhancing the image's sharpness, dynamic range of brightness and color, and the like) and displaying the enhanced image on a viewfinder or a display of mobile device 130. While an enhanced image may be more aesthetically pleasing to the user, such enhancements can impede or even prevent mobile device 130 from accurately and efficiently detect objects in the image.

Figure 6B:
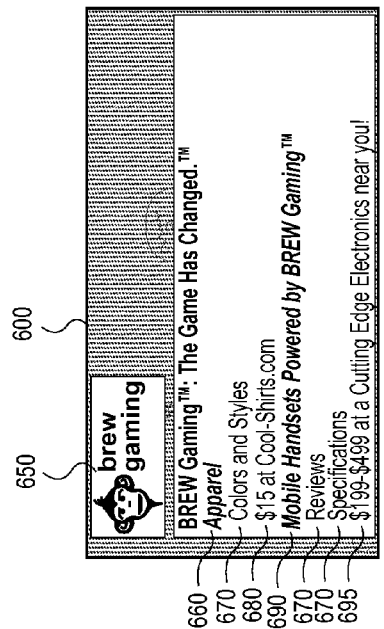

In 420, mobile device 130 can highlight or otherwise indicate detected objects of the image by superimposing indicators over the image. For example, the indicators can include various forms of augmented reality graphics, such as indicators around patterns 115 as shown in FIG. 1 and around patterns 610-620 as shown in FIGS. 6A and 6B, boxes, bullseye hyperlinks, or the like. If mobile device 130 has determined the detected objects' categories in 415, then mobile device 130 can highlight only the detected objects categorized as being in one or more preselected or user-selected categories. Next, in 425, mobile device 130 can receive input from the user to select at least one of the highlighted objects, such as selected pattern 610 as shown in FIG. 6B. User input can include an affirmative input or other actions from the user via the user input interface. User input can also include the user holding mobile device 130 still such that image sensor 200 is focused on one of the detected objects for a threshold period of time.

Next, in 430, mobile device 130 can categorize, recognize, or otherwise determine characteristics the selected object. Mobile device 130 can optionally refine the generated feature vector corresponding to the selected object. Mobile device 130 can determine the selected object's category by comparing the selected object's feature vector with image coefficients of trained images for one or more categories of features stored in image coefficient library 262. If mobile device 130 has categorized the selected object (in 415), then mobile device 130 can retain the selected object's category without further categorizing the selected object. In one implementation, mobile device 130 can compare the selected object's feature vector with image coefficients of trained images stored in image coefficient library 262 to recognize or otherwise determine characteristics of the selected object. In one implementation, mobile device 130 can compare the selected object's feature vector with the trained images' vector of coefficients by calculating a distance (e.g., Manhalanobis distance, Euclidean distance, etc.) between the vectors to find a trained image that matches the selected object. If mobile device 130 finds a trained image that matches the selected object, then mobile device 130 can recognize the selected object based on the matching trained image. The number of dimensions of the feature vectors directly correlates with the time and processing power required to match the features vectors, and thus it may be desirable to minimize the number of dimensions of the feature vectors. However, the feature vectors should have sufficient dimensions to be distinctive and also robust to noise, detection errors, and geometric and photometric deformations.

In 435, mobile device 130 can generate metadata associated with the selected object based on the trained image that matches the selected object. For example, if mobile device 130 matches the selected object to a trained image of the BREW GAMING MONKEY™ logo, mobile device 130 can generate metadata indicating that the selected object is the BREW GAMING MONKEY™ logo or includes a BREW GAMING™ product. Alternatively, if mobile device 130 could not match the selected object to a trained image, then mobile device 130 can generate metadata that includes the feature vector of the selected object.

In 440, mobile device 130 can acquire contextual data associated with the acquired image. Mobile device 130 can acquire the location, position, orientation, movement, and/or other contextual data associated with mobile device 130 when acquiring the image or processing the image to detect objects. For example, the contextual data can include a GPS location of where the image was acquired. For another example, the contextual data can include the orientation of mobile device 130 (e.g., upward at a billboard, downward at a magazine, or the like) or the ambient temperature at the time the image was acquired. For yet another example, the contextual data can include user-entered textual or auditory information, such as a text or voice message like "at the U.S. Open," passive information like background noise, and directives like "who is the lady on the left?" or "what is the lady on the left wearing?" In one implementation, mobile device 130 can acquire contextual data independently in 440 or simultaneously with any of the processing performed in 410 to 435.

Next, in 445, mobile device 130 can generate a visual search query based on the acquired image and communicate the visual search query to back-end 300 of image recognition system 120. The visual search query can include a destination address to a processor or server in back-end 300 or a process running therein, and the destination address can be tailored based on the selected object's category. In one implementation, a visual search query can include the acquired image or a sub-image extracted from the acquired image based on the selected object, and the metadata and/or contextual data associated with the acquired image or extracted sub-image. Mobile device 130 can crop, compress, scale, convert to grayscale, or otherwise process the acquired image to extract or otherwise generate at least one sub-image based on the selected object.

Figure 6C:
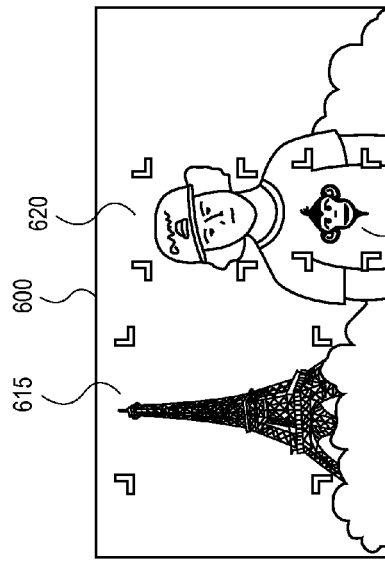

For example, as illustrated in FIGS. 1 and 6C, if the selected object is recognized in 430 as the BREW GAMING MONKEY™ logo, mobile device 130 can crop or otherwise process the acquired image to extract a sub-image that includes the logo or the object (e.g., a t-shirt 630, an advertisement, a coupon, a cap, a pair of shoes, etc.) on which the logo is affixed. Alternatively or in addition, mobile device 130 can crop or otherwise process the acquired image according to instructions received from or specified by the user of mobile device 130 or according to computer-readable instructions that have previously been received by mobile device 130. After generating the visual search query, which includes the acquired image or the extracted sub-image and the metadata and/or contextual data associated with the acquired image or the extracted sub-image, mobile device 130 can communicate the visual search query to back-end 300 of image recognition system 120. The extracted sub-image has a smaller file size than that of the acquired image. Therefore a visual search query is communicated that includes the extracted sub-image, instead of the entire acquired image. This image reduction, again, can enhance the speed at which the visual search query is communicated. Moreover, communicating a visual search query that includes the extracted sub-image instead of the entire acquired image can also decrease the communication bandwidth requirement to the server or other destination.

Figure 6D:
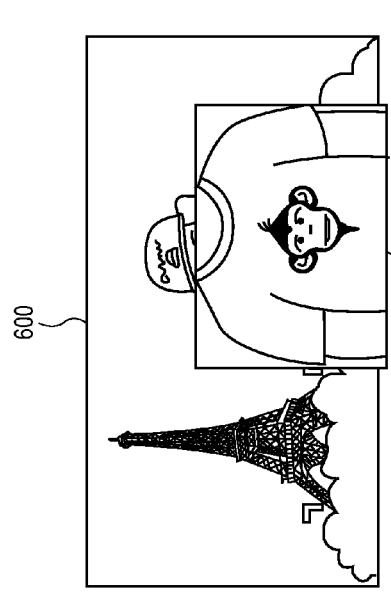

In 450, mobile device 130 can receive from back-end 300 and present to the user a visual search result in response to the visual search query. Mobile device 130 can also store the visual search result and/or associate the visual search result with the visual search query, and can receive and store annotations from the user regarding the visual search result. Thereafter, mobile device 130 can transmit the visual search result, the visual search query, and/or user annotations via a communication protocol. The visual search result can include information content associated with the selected object in the acquired image. For example, if the selected object is a logo (e.g., logo in selected pattern 610 as shown in FIG. 6B, etc.), then the information content can include product information (e.g., a product brand 650 and a product type 660 as shown in FIG. 6D), directed links to the product information (e.g., information links 670), related products (e.g., a related product 690 and an advertisement 695), links to online retailers for comparison shopping, to save to a wish list, to share with a friend, or to purchase instantly (e.g., a purchase link 680), etc., or any combination thereof. If the selected object is a celebrity's face, then the information content can include, for example, the celebrity's name, his or her biography, products, and/or services associated with the celebrity, and other relevant information, or any combination thereof. If the selected object is a landmark, then the information content can include the landmark's name, history, products, and/or services associated with the landmark, and other relevant information, or any combination thereof. In one implementation, mobile device 130 can receive a feedback request from back-end 300 regarding the visual search result, such as a confirmation dialog for the user to rate the accuracy or relevance of the search result, an input dialog for the user to annotate the search result, or the like. The above listing of various categories and types of images, metadata, contextual data, visual search query and result, information content, and user feedback mechanisms are for illustration purposes only and are not meant to limit the present teachings in any way.

FIG. 5 illustrates a flowchart of processing that can be performed by back-end 300 (as shown in FIG. 3) to enable visual searching and facilitate image recognition using image recognition system 120 (as shown in FIG. 1), according to one implementation of the present teachings. In 510, remote server 140 (as shown in FIGS. 1 and 3) in back-end 300 can receive a visual search query via wireless connection 132 and wireless services provider 150 or other means of data transmission known to one skilled in the art. As described above, the visual search query can include an image that contains at least one object of interest, and metadata and/or contextual data associated with the image. For illustration purposes, an exemplary visual search query generated based on image 600 (as shown in FIG. 6C) can include an image of t-shirt 630, metadata indicating that the image is associated with BREW GAMING™, and contextual data indicating that the image was acquired at a particular GPS location.

Next, in 515, remote server 140 can recognize or otherwise identify the object of interest in the image based on the visual search query. Remote server 140 can utilize metadata and/or contextual data associated with the image, as well as any user feedback associated with search results previously provided for similar visual search queries, to assist in recognizing the object of interest, which enables remote server 140 to focus or otherwise limit the scope of the visual search, and thus improving the accuracy, speed, and/or efficiency of image recognition system 120. In one implementation, remote server 140 can execute image recognition software 364 stored in image recognition server 146 to perform a one-to-one matching of the image with image data (e.g., image raster data, image coefficients, or the like) stored in image data and coefficient library 366. Remote server 140 can focus the one-to-one matching based on the metadata and/or contextual data associated with the image. For example, after receiving the exemplary visual search query generated based on image 600, remote server 140 can focus the one-to-one matching of t-shirt 630 to stored image data associated with BREW GAMING™.

As an alternative or in addition to one-to-one matching, in 515, remote server 140 can execute image recognition software 364 to detect at least one object of interest in the image and compute a feature vector that uniquely represents the object of interest. Remote server 140 can recognize the object of interest based on the computed feature vector by comparing the feature vector with image coefficients of possible image candidates, or trained images, stored in image data and coefficient library 366. In one implementation, remote server 140 can match the computed feature vector with the trained images' vector of coefficients by calculating a distance (e.g., Manhalanobis distance, Euclidean distance, etc.) between the vectors to recognize the object of interest. Remote server 140 can then recognize the object of interest based on a matching trained image. Remote server 140 can focus the vector matching based on the metadata and/or contextual data associated with the image. For example, after receiving the exemplary visual search query generated based on image 600, remote server 140 can focus the matching of a feature vector computed from t-shirt 630 to stored image coefficients associated with BREW GAMING™.

In 520, remote server 140 can generate a visual search result, including information content, based on the recognized object of interest in response the visual search query. Remote server 140 can perform a semantic search based on the recognized object, the metadata, and/or the contextual data associated with the image, as well as any user feedback associated with search results previously provided for similar visual search queries, to retrieve information content associated with and/or relevant to the recognized object. By focusing or otherwise limiting the scope of the semantic search using the associated metadata and/or contextual data, remote server 140 and hence image recognition system 120 can provide more accurate and/or more relevant information content in response to a visual search query.

In one implementation, remote server 140 can execute search engine 344 stored in content server 144 to perform a semantic search for information content stored in information content database 346. Remote server 140 can focus the semantic search based on the metadata and/or contextual data associated with the image. For example, after receiving the exemplary visual search query generated based on image 600 and recognizing that t-shirt 630 includes an image of the BREW GAMING MONKEY™ logo, remote server 140 can perform a semantic search for BREW GAMING™ to retrieve relevant information content, such as product information (e.g., product brand 650 and product type 660 as shown in FIG. 6D), directed links to the product information (e.g., information links 670), related products (e.g., related product 690), links to online retailers for comparison shopping, to save to a wish list, to share with a friend, or to purchase instantly (e.g., purchase link 680), etc., or any combination thereof. For a further example, remote server 140 can utilize associated contextual data (e.g., a GPS location, user-entered textual or auditory information, etc.) to focus the semantic search to retrieve relevant information content based on the GPS location, such as advertisement 695 (as shown in FIG. 6D) for related product 690 at a store near the GPS location, coupons and promotions available at nearby stores corresponding to the GPS location, and the like. The above listing of various types of search queries, images, objects of interest, metadata, contextual data, visual search query and result, and information content are for illustration purposes only and are not meant to limit the present teachings in any way.

Next, in 525, remote server 140 can communicate or otherwise provide the visual search result, including the relevant information content, to mobile device 130 via wireless connection 132 and wireless services provider 150 or other means of data transmission known to one skilled in the art. Remote server 140 can also communicate a request for user feedback regarding the visual search result, such as a confirmation dialog for the user to rate the accuracy or relevance of the search result, an input dialog for the user to annotate the search result, or the like. In 530, remote server 140 can record the visual search query for any purpose, such as fee-collection, reporting, data-mining, user or product profiling, future marketing, or the like. Further, remote server 140 can record the visual search result in association with or independent of the corresponding visual search query for any purpose. Remote server 140 can also record and/or associate user feedback to the visual search result for any purpose, such as training image recognition software 364 and/or search engine 344, fee-collection, reporting, data-mining, user or product profiling, future marketing, or the like. Moreover, remote server 140 can cache the visual search result to quickly provide search results and to minimize redundant processing in response to future visual search queries that are identical or nearly identical to the visual search query. Furthermore, remote server 140 can record statistics associated with the processing of the visual search query by image recognition system 120, such as the search time, the level of confidence in the relevancy of the information content in the visual search result, or the like.

When the implementations described herein are implemented in software, firmware, middleware, microcode, and/or program code or code segments, they can be stored in a computer-readable storage medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

The foregoing description is illustrative, and variations in configuration and implementation may occur to persons skilled in the art. For instance, the various illustrative logics, logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary implementations, the functions described may be implemented in hardware, software, firmware, or any combination thereof. For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art. If implemented in software, the functions may be stored on or transmitted over as one or more instructions or code on a computer-readable medium. Computer-readable media includes both tangible computer storage media and communication media including any medium that facilitates transfer of a computer program from one place to another. A storage media may be any available tangible media that can be accessed by a computer. By way of example, and not limitation, such tangible computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, DVD, floppy disk and blu-ray disc where disks usually reproduce data magnetically, while discs reproduce data optically with lasers. Combinations of the above should also be included within the scope of computer-readable media.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95, and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE, and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

The steps of a method or algorithm described in connection with the implementations disclosed herein may be embodied directly in hardware, in a software module executed by a processor, or in a combination of the two. Although the method has been described by examples, the steps of the method may be performed in a different order than illustrated or simultaneously. A software module may reside in RAM memory, flash memory, ROM, EPROM, EEPROM, registers, a hard disk, a removable disk, a CD-ROM, or any other form of computer-readable storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a mobile device. In the alternative, the processor and the storage medium may reside as discrete components in a mobile device. Other resources described, as singular or integrated can in one implementation be plural or distributed, and resources described as multiple or distributed can in implementations be combined. The scope of the present teachings is accordingly intended to be limited only by the following claims.

What is claimed is:

1. A mobile device, comprising:
   a wireless interface to a server; and
   a processor, communicating with the wireless interface, the processor being configured to initiate processing comprising:
   acquiring an image;
   detecting one or more objects in the acquired image;
   receiving input that indicates a user selection of at least one of the detected objects;
   generating metadata associated with the selected object;
   extracting a query image from the acquired image based on the selected object;
   generating a visual search query, wherein the visual search query includes the query image and the metadata;
   communicating the visual search query to the server via the wireless interface; and
   receiving and presenting, in response to the visual search query, information content associated with the at least one object.

2. The mobile device of claim 1, wherein generating metadata further comprises:
   categorizing one or more of the detected objects as being in an object category;
   highlighting the categorized objects;
   receiving input that indicates a selected one of the categorized objects; and
   generating the metadata based on the object category of the selected object.

3. The mobile device of claim 2, wherein categorizing one or more of the detected objects further comprises:
   generating a feature vector based on at least one of the detected objects;
   comparing the feature vector with a set of image coefficients of trained images in the object category to determine a matching trained image in the object category that matches the at least one detected object, wherein the set of image coefficients is stored in the mobile device; and
   categorizing the detected object based on the matching trained image.

4. The mobile device of claim 3, wherein the processor performs, in real-time, the operations of acquiring, detecting, highlighting, and categorizing.

5. The mobile device of claim 3, wherein the object category includes a logo, a design, a face, a landmark, apparel, a sign, a natural object, or a man-made object.

6. The mobile device of claim 1, wherein generating the metadata further comprises:
   highlighting, on a user interface of the mobile device, the detected objects.

7. The mobile device of claim 6, wherein generating the metadata further comprises:
   categorizing the selected object as being in an object category; and
   generating the metadata based on the object category of the selected object.

8. The mobile device of claim 7, wherein communicating the visual search query to the server further comprises:
   generating a destination address for the visual search query based on the object category of the selected object; and
   communicating the visual search query to the server according to the destination address.

9. The mobile device of claim 1, wherein extracting a query image from the acquired image further comprises cropping the acquired image, compressing the acquired image, scaling the acquired image, or converting the acquired image to grayscale.

10. The mobile device of claim 1, wherein generating metadata further comprises:
    generating a feature vector based on at least one of the detected objects;
    comparing the feature vector with a set of image coefficients of trained images to determine a matching trained image that matches the detected object, wherein the set of image coefficients is stored in the mobile device;
recognizing the detected object based on the matching trained image; and
generating the metadata associated with the recognized object based on the matching trained image.

11. The mobile device of claim 1, wherein the mobile device comprises a contextual data sensor, and wherein acquiring an image further comprises:
acquiring contextual data associated with the acquired image via the contextual data sensor, wherein the visual search query further includes the contextual data.

12. The mobile device of claim 11, wherein the contextual data comprises a Global Positioning System (GPS) location fix, an Assisted Global Positioning System (A-GPS) location fix, a Galileo system location fix, a tower trilateration fix, textual information, auditory information, an accelerometer reading, a gyroscope reading, or a temperature reading.

13. The mobile device of claim 1, wherein the information content includes a name, a price, a manufacturer, a review, a coupon, or an advertisement.

14. A method of performing image recognition, comprising:
acquiring an image by a mobile device;
detecting one or more objects in the acquired image;
receiving input that indicates a user selection of at least one of the detected objects;
generating metadata associated with the selected object;
extracting a query image from the acquired image based on the selected object;
generating a visual search query, wherein the visual search query includes the query image and the metadata;
wirelessly communicating the visual search query; and
receiving and presenting, in response to the visual search query, information content associated with the at least one object.

15. The method of claim 14, wherein generating metadata further comprises:
categorizing one or more of the detected objects as being in an object category;
highlighting the categorized objects;
receiving input that indicates a selected one of the categorized objects; and
generating the metadata based on the object category of the selected object.

16. The method of claim 15, wherein categorizing one or more of the detected objects further comprises:
generating a feature vector based on at least one of the detected objects;
comparing the feature vector with a set of image coefficients of trained images in the object category to determine a matching trained image in the object category that matches the at least one detected object, wherein the set of image coefficients is stored in the mobile device; and
categorizing the detected object based on the matching trained image.

17. The method of claim 16, wherein the mobile device performs, in real-time, the operations of acquiring, detecting, highlighting, or categorizing.

18. The method of claim 14, wherein generating the metadata further comprises:
highlighting the detected objects.

19. The method of claim 18, wherein generating the metadata further comprises:
categorizing the selected object as being in an object category; and
generating the metadata based on the object category of the selected object.

20. The method of claim 19, wherein wirelessly communicating the visual search query further comprises:
generating a destination address for the visual search query based on the object category of the selected object; and
communicating the visual search query to a destination according to the destination address.

21. The method of claim 14, wherein acquiring an image further comprises:
acquiring contextual data associated with the acquired image via a contextual data sensor of the mobile device, the visual search query further including the contextual data.

22. A system for performing image recognition, comprising:
means for acquiring an image by a mobile device;
means for detecting one or more objects in the acquired image;
means for receiving input that indicates a user selection of at least one of the detected objects;
means for generating metadata associated with the selected object;
means for extracting a query image from the acquired image based on the selected object;
means for generating a visual search query, wherein the visual search query includes the query image and the metadata;
means for wirelessly communicating the visual search query; and
means for receiving and presenting, in response to the visual search query, information content associated with the at least one object.

23. The system of claim 22, wherein the means for generating metadata further comprises:
means for categorizing one or more of the detected objects as being in an object category;
means for highlighting the categorized objects;
means for receiving input that indicates a selected one of the categorized objects; and
means for generating the metadata based on the object category of the selected object.

24. The system of claim 23, wherein the means for categorizing one or more of the detected objects further comprises:
means for generating a feature vector based on at least one of the detected objects;
means for comparing the feature vector with a set of image coefficients of trained images in the object category to determine a matching trained image in the object category that matches the at least one detected object, wherein the set of image coefficients is stored in the mobile device; and
means for categorizing the detected object based on the matching trained image.

25. The system of claim 24, wherein the means for acquiring, detecting, highlighting, and categorizing perform in real-time.

26. The system of claim 22, wherein the means for generating the metadata further comprises:
means for highlighting the detected objects.

27. The system of claim 26, wherein the means for generating the metadata further comprises:
means for categorizing the selected object as being in an object category; and
means for generating the metadata based on the object category of the selected object.

28. The system of claim 27, wherein the means for wirelessly communicating the visual search query further comprises:
   means for generating a destination address for the visual search query based on the object category of the selected object; and
   means for communicating the visual search query to a destination according to the destination address.

29. The system of claim 22, wherein the means for acquiring an image further comprises:
   means for acquiring contextual data associated with the acquired image via a contextual data sensor of the mobile device, the visual search query further including the contextual data.

30. A non-transitory computer-readable medium storing instructions that cause a computer to perform image recognition when executed by the computer, comprising:
   at least one instruction for causing the computer to acquire an image;
   at least one instruction for causing the computer to detect one or more objects in the acquired image;
   at least one instruction for causing the computer to receive input that indicates a user selection of at least one of the detected objects;
   at least one instruction for causing the computer to generate metadata associated with the selected object;
   at least one instruction for causing the computer to extract a query image from the acquired image based on the selected object;
   at least one instruction for causing the computer to generate a visual search query, wherein the visual search query includes the query image and the metadata;
   at least one instruction for causing the computer to wirelessly communicate the visual search query; and
   at least one instruction for causing the computer to receive and present, in response to the visual search query, information content associated with the at least one object.

31. The non-transitory computer-readable medium of claim 30, wherein the at least one instruction for causing the computer to generate metadata further comprises:
   at least one instruction for causing the computer to categorize one or more of the detected objects as being in an object category;
   at least one instruction for causing the computer to highlight the categorized objects;
   at least one instruction for causing the computer to receive input that indicates a selected one of the categorized objects; and
   at least one instruction for causing the computer to generate the metadata based on the selected object category of the selected object.

32. The non-transitory computer-readable medium of claim 31, wherein the at least one instruction for causing the computer to categorize one or more of the detected objects further comprises:
   at least one instruction for causing the computer to generate a feature vector based on at least one of the detected objects;
   at least one instruction for causing the computer to compare the feature vector with a set of image coefficients of trained images in the object category to determine a matching trained image in the object category that matches the at least one detected object, wherein the set of image coefficients is stored in the computer; and
   at least one instruction for causing the computer to categorize the detected object based on the matching trained image.

33. The non-transitory computer-readable medium of claim 32, wherein the at least one instruction for causing the computer to acquire, detect, highlight, and categorize causes the computer to acquire, detect, highlight, and categorize in real-time.

34. The non-transitory computer-readable medium of claim 30, wherein the at least one instruction for causing the computer to generate the metadata further comprises:
   at least one instruction for causing the computer to highlight the detected objects.

35. The non-transitory computer-readable medium of claim 34, wherein the at least one instruction for causing the computer to generate the metadata further comprises:
   at least one instruction for causing the computer to categorize the selected object as being in an object category; and
   at least one instruction for causing the computer to generate the metadata based on the object category of the selected object.

36. The non-transitory computer-readable medium of claim 35, wherein the at least one instruction for causing the computer to wirelessly communicate the visual search query further comprises:
   at least one instruction for causing the computer to generate a destination address for the visual search query based on the object category of the selected object; and
   at least one instruction for causing the computer to communicate the visual search query to a destination according to the destination address.

37. The non-transitory computer-readable medium of claim 30, wherein the at least one instruction for causing the computer to acquire an image further comprises:
   at least one instruction for causing the computer to acquire contextual data associated with the acquired image via a contextual data sensor of the mobile device, the visual search query further including the contextual data.

38. A system for performing image recognition, comprising:
   a server configured to:
      receive a visual search query from a mobile device, wherein the visual search query includes an image and metadata associated with at least one object in the image, the at least one object selected by a user from one or more objects detected in the image,
      recognize an object in the image associated with the at least one object based on the metadata,
      generate information content based on the recognized object, and
      communicate the information content in response to the visual search query.

39. The system of claim 38, wherein
   the visual search query further includes contextual data associated with the image; and
   further wherein the server is configured to generate the information content based on the recognized object and the contextual data.

40. The system of claim 39, wherein the contextual data comprises a Global Positioning System (GPS) location fix, an Assisted Global Positioning System (A-GPS) location fix, a Galileo system location fix, a tower trilateration fix, textual information, auditory information, an accelerometer reading, a gyroscope reading, or a temperature reading.

41. The system of claim 38, wherein the server is further configured to:

compare the image with trained images to determine a matching trained image that matches the image, wherein the trained images are selected based on the metadata, and recognize the object in the image based on the matching trained image.

42. The system of claim 38, wherein the server is further configured to:

detect the object in the image based on the metadata, generate a feature vector of the object, compare the feature vector with image coefficients of trained images to determine a matching trained image that matches the object, wherein the image coefficients are selected based on the metadata, and recognize the object based on the matching trained image.

43. The system of claim 38, wherein the object includes a logo, a design, a face, a landmark, apparel, a sign, a natural object, or a man-made object.

44. The system of claim 38, wherein the information content includes a name, a price, a manufacturer, a review, a coupon, or an advertisement.

45. The system of claim 38, wherein the server is further configured to:

store the visual search query, and associate the information content with the visual search query.

46. A method of performing image recognition, comprising:

receiving a visual search query from a mobile device, wherein the visual search query includes an image and metadata associated with at least one object in the image, the at least one object selected by a user from one or more objects detected in the image;

recognizing an object in the image associated with the at least one object based on the metadata;

generating information content based on the recognized object; and communicating the information content in response to the visual search query.

47. The method of claim 46, wherein the visual search query further includes contextual data associated with the image, and further wherein generating information content comprises generating the information content based on the recognized object and the contextual data.

48. The method of claim 47, wherein the contextual data comprises a Global Positioning System (GPS) location fix, an Assisted Global Positioning System (A-GPS) location fix, a Galileo system location fix, a tower trilateration fix, textual information, auditory information, an accelerometer reading, a gyroscope reading, or a temperature reading.

49. The method of claim 46, wherein recognizing an object in the image further comprises:

comparing the image with a set of trained images to determine a matching trained image that matches the image, wherein the set of trained images is selected based on the metadata; and recognizing the object in the image based on the matching trained image.

50. A system of performing image recognition, comprising:

means for receiving a visual search query from a mobile device, wherein the visual search query includes an image and metadata associated with at least one object in the image, the at least one object selected by a user from one or more objects detected in the image;

means for recognizing an object in the image associated with the at least one object based on the metadata;

means for generating information content based on the recognized object; and means for communicating the information content in response to the visual search query.

51. The system of claim 50, wherein the visual search query further includes contextual data associated with the image, and further wherein the means for generating information content comprises means for generating the information content based on the recognized object and the contextual data.

52. The system of claim 51, wherein the contextual data comprises a Global Positioning System (GPS) location fix, an Assisted Global Positioning System (A-GPS) location fix, a Galileo system location fix, a tower trilateration fix, textual information, auditory information, an accelerometer reading, a gyroscope reading, or a temperature reading.

53. The system of claim 50, wherein the means for recognizing an object in the image further comprises:

means for comparing the image with a set of trained images to determine a matching trained image that matches the image, wherein the set of trained images is selected based on the metadata; and means for recognizing the object in the image based on the matching trained image.

54. A non-transitory computer-readable medium storing instructions that cause a computer to perform image recognition when executed by the computer, comprising:

at least one instruction for causing the computer to receive a visual search query from a mobile device, wherein the visual search query includes an image and metadata associated with at least one object in the image, the at least one object selected by a user from one or more objects detected in the image;

at least one instruction for causing the computer to recognize an object in the image associated with the at least one object based on the metadata;

at least one instruction for causing the computer to generate information content based on the recognized object; and at least one instruction for causing the computer to communicate the information content in response to the visual search query.

55. The non-transitory computer-readable medium of claim 54, wherein the visual search query further includes contextual data associated with the image, and further wherein the at least one instruction for causing the computer to generate information content comprises at least one instruction for causing the computer to generate the information content based on the recognized object and the contextual data.

56. The non-transitory computer-readable medium of claim 55, wherein the contextual data comprises a Global Positioning System (GPS) location fix, an Assisted Global Positioning System (A-GPS) location fix, a Galileo system location fix, a tower trilateration fix, textual information, auditory information, an accelerometer reading, a gyroscope reading, or a temperature reading.

57. The non-transitory computer-readable medium of claim 54, wherein the at least one instruction for causing the computer to recognize an object in the image further comprises:

at least one instruction for causing the computer to compare the image with a set of trained images to determine a matching trained image that matches the image, wherein the set of trained images is selected based on the metadata; and at least one instruction for causing the computer to recognize the object in the image based on the matching trained image.

* * * * *